(12) United States Patent
Kitamura et al.

(10) Patent No.: US 7,307,674 B2
(45) Date of Patent: Dec. 11, 2007

(54) BACK LIGHT UNIT FOR LIQUID CRYSTAL DISPLAY DEVICE AND METHOD FOR MANUFACTURING THE UNIT

(75) Inventors: Takeshi Kitamura, Kyoto (JP); Yasukazu Kondo, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 11/656,967

(22) Filed: Jan. 24, 2007

(65) Prior Publication Data

US 2007/0121031 A1   May 31, 2007

Related U.S. Application Data

(62) Division of application No. 10/120,770, filed on Apr. 12, 2002, now Pat. No. 7,173,677.

(30) Foreign Application Priority Data

Apr. 12, 2001 (JP) ............... 2001-114003
Apr. 23, 2001 (JP) ............... 2001-123802

(51) Int. Cl.
*G02F 1/1333* (2006.01)
*G02F 1/1335* (2006.01)

(52) U.S. Cl. .............. 349/58; 349/62; 349/65

(58) Field of Classification Search .......... 349/58, 349/62, 65
See application file for complete search history.

(56) References Cited

U.S. PATENT DOCUMENTS

| 5,727,862 | A | 3/1998 | Wu ..................... 362/27 |
| 5,978,060 | A | 11/1999 | Nakawaki et al. ...... 349/150 |
| 6,333,779 | B1 * | 12/2001 | Tabata et al. ............ 355/68 |
| 6,333,799 | B1 | 12/2001 | Bala et al. .................. 398/9 |
| 6,473,154 | B2 * | 10/2002 | Tabata et al. ............ 355/41 |

FOREIGN PATENT DOCUMENTS

| JP | 4-310737 | 11/1992 |
| JP | 7-43713 | 2/1995 |
| JP | 2000-127248 | 5/2000 |

* cited by examiner

*Primary Examiner*—Mike Qi
(74) *Attorney, Agent, or Firm*—Morgan, Lewis & Bockius LLP

(57) ABSTRACT

A pin 6 provided at a horn 5 for ultrasonic welding is press-fitted to the depth reaching the light guide plate 1 breaking through the various kind of sheets 2 and 3 from surface side thereof. Another embodiment of the invention is that pins 25 constructed so as to break through various kind of sheets 22 and 23 on the surface of the plate are provided on the light guide plate 21, and the various kind of sheets 22 and 23 are fixed on the light guide plate 1 by distorting by caulking using ultrasonic vibration of the tip end of the pin.

4 Claims, 7 Drawing Sheets

BACK LIGHT UNIT FOR LIQUID CRYSTAL DISPLAY DEVICE AND METHOD FOR MANUFACTURING THE UNIT

This application is a Divisional of U.S. Patent application Ser. No. 10/120,770, filed Apr. 12, 2002 now U.S. Pat. No. 7,173,677 and claims the benefit of Japanese Patent Applications 2001-114003 and 2001-123802, filed Apr. 12, 2001 and Apr. 23, 2001, respectively, all of which are hereby incorporated by reference in their entirety.

BACKGROUND OF THE INVENTION

1. Field of the Invention

The present invention relates to a structure of a back light unit arranged at rear surface of a back light type liquid crystal display device and a method for manufacturing the unit.

2. Description of the Related Art

Generally, a back light type liquid crystal display device is constructed so that a light guide plate made of transparent synthetic resin such as acryl is provided at rear side thereof and light from a light source arranged at one end surface or both end surfaces of the light guide plate is scattered to whole liquid crystal display device through the light guide plate. A reflective sheet is laminated at a rear surface opposite to the liquid crystal display device among the light guide plate, on the other hand, at a surface of the liquid crystal display device among the light guide plate, a brightness rising sheet is laminated at least one light diffusion sheet made of synthetic resin, or the light diffusion sheets are laminated in layers as the need arises.

In this case, at least one light diffusion sheet, the light diffusion sheet and the brightness rising sheet, or the reflective sheet laminated on the light guide plate is fixed on the light guide plate.

For fixing, there are a method using adhesive double-coated tape or stickness adhesive and a method welding. The former method using adhesive double-coated tape or stickness adhesive incurs remarkable cost-up because of manual work, and in the later method welding, welding area is small when each sheet is made of synthetic resin material different in kind of the light guide plate, thereby the method can not be applied because of low welding strength.

Then, Japanese Patent Laid-Open Hei 7-043713 of the related art proposes to drive a metal sticking member such as eyelet into the light guide plate so as to reach the light guide plate passing through the various kind of sheets by ultrasonic vibration as the method fixing light diffusion sheet, the light diffusion sheet and the brightness rising sheet, or the reflective sheet.

However, the method by the related art makes not only the cost for fixing but also cost for the production of the back light unit increase considerably because the metal sticking member such as eyelet is provided particularly and the metal sticking member is driven into the light guide plate. Further, there is a problem that thickness of the back light unit increases, the size becomes large, and the weight remarkably increase because a head portion of the driven sticking member projecting from the surface of the sheet.

SUMMARY OF THE INVENTION

To achieve the technical object, the back light unit of the invention is characterized by laminating at least one sheet member chosen from a group of a light diffusion sheet, the light diffusion sheet and a brightness rising sheet, and a reflective sheet on a light guide plate made of transparent synthetic resin arranged at rear surface side of a liquid crystal display device, wherein the sheet member is welded to the light guide plate by press-fitting a pin provided at a horn for ultrasonic welding to the depth reaching the light guide plate breaking through from the sheet member from surface side of the sheet member.

A method for manufacturing a back light unit of the invention comprises the steps of laminating at least a sheet member chosen from a group of a light diffusion sheet, a light diffusion sheet and a brightness rising sheet, and a reflective sheet on a light guide plate made of transparent synthetic resin arranged at rear surface side of a liquid crystal display device, and press-fitting a pin provided at a horn for ultrasonic welding to the depth reaching the light guide plate breaking through from the sheet member from surface side of the sheet member.

Thus, after laminating various kind of sheets (the sheet member) on the light guide plate, the pin provided at the horn for ultrasonic welding is press-fitted to depth reaching the light guide plate breaking through the various kind of sheets from surface side thereof. By the breaking-through, a hollow hole is formed at a laminating body of the light guide plate and various kind of sheets caused of breaking through by ultrasonic vibration, a part contacting the pin among the various kind of sheets is pushed into the hollow hole drawing out, and a part of the light guide plate melts, exudes, and welds to the various kind of sheets. Therefore, the various kind of sheets and the light guide plate are welded surely and strongly in the hollow hole even if the various kind of sheets and the light guide plate are synthetic resin different in kind.

That is, according to the invention, since various kind of sheets are fixed to the light guide plate surely and strongly without using metal fixing member as the related art, the invention does not cause large size and heavy weight and has advantages reducing drastically not only the cost for the fixing but also product cost of the back light unit.

Further, by constructing the pin provided at the horn for ultra sonic welding in taper shape of thin nose, the taper pin can be drown easily from the state pushing into various kind of sheets and the light guide plate. Therefore, since drawing out various kind of sheets is avoided at drawing the taper pin, reliability of welding in the hollow hole and welding strength are further improved.

Even further, by press-fitting the pin at a part close to one side surface of the light guide plate at plural places along the one side surface, various kind of sheets are fixed surely with the state not shifting sideways to the light guide, and it is avoided to generate wrinkles at the various kind of sheets because of difference of thermal expansion with the light guide plate.

Another back light unit of the invention is characterized by laminating at least one sheet member chosen from a group of a light diffusion sheet, a light diffusion sheet and a brightness rising sheet, and a reflective sheet on a light guide plate made of transparent synthetic resin arranged at rear surface side of a liquid crystal display device, wherein a pin constructed in thin nose so as to beak through the sheet member laminated on the surface of the light guide plate is provided integratedly on the light guide plate, and the sheet member are fixed on the light guide plate by distorting of a tip end of the pin by caulking using ultrasonic vibration.

Another method for manufacturing a back light unit of the invention comprises the steps of providing a pin constructed in thin nose integratedly on a light guide plate made of transparent synthetic resin arranged at rear surface side of a liquid crystal display device so as to project from the surface of the plate, laminating at least a sheet member chosen from a group of a light diffusion sheet, a light diffusion sheet and a brightness rising sheet, and a reflective sheet so that the pins break through these various kind of sheets, and distorting of a tip end of the pin by caulking using a horn for ultrasonic welding.

Thus, in the back light unit, the pin penetrating the various kind of sheets (sheet member) laminated on the surface of the light guide are provided integratedly on the light guide plate, and tip end of the pin is distorted by caulking using the horn for ultrasonic welding. By the distortion, fixing of the various kind of sheet to the light guide plate is performed in shorter time than the case that the tip end of the pins are distorted by caulking using iron member heated in high temperature, and the various kind of sheets are welded surely and strongly even if the various kind of sheets are synthetic resin different in kind from the light guide plate.

Further, by constructing the pins in thin nose, the pins melt from the tip end of thin nose at distorting the tip end of the pin by caulking while melting by ultrasonic vibration. Because of that, a part of root to the light guide plate among the entire pin starts to melt early, and melting resin of the pin invades between the various kind of sheets and the light guide plate, and between mutual various kind of sheets, it is surely prevented that space thereby generates between the various kind of sheets and the light guide plate, and between mutual various kind of sheets.

Incidentally, distortion by caulking melting with contact of heating iron generates sheet separation between the various kind of sheets pulling up the distortion portion by caulking caused by sticking of melting resin. However, the horn cools rapidly by stop of ultrasonic vibration at the horn and melting resin does not fix to the horn in the case distorting the tip end of the pin by caulking using the horn for ultrasonic welding, thereby the various kind of sheets are surly fixed without generating sheet separation.

Therefore, according to the invention, space does not generate between the various kind of sheets and the light guide plate, and between mutual various kind of sheets even if the various kind of sheets are different synthetic resin in kind from the light guide plate, further, the various kind of sheets are fixed surely and strongly to the light guide plate without causing weight-up.

Further, by arranging the pin at a part close to one side surface of the light guide plate at a plurality of places along the one side surface, various kind of sheets are fixed surely with the state not shifting sideways to the light guide, and it is avoided to generate wrinkles at the various kind of sheets because of difference of thermal expansion with the light guide plate.

DESCRIPTION OF THE PREFERRED EMBODIMENTS

A mode for carrying out the invention will be described referring FIG. 1 to FIG. 5.

Figure 1:
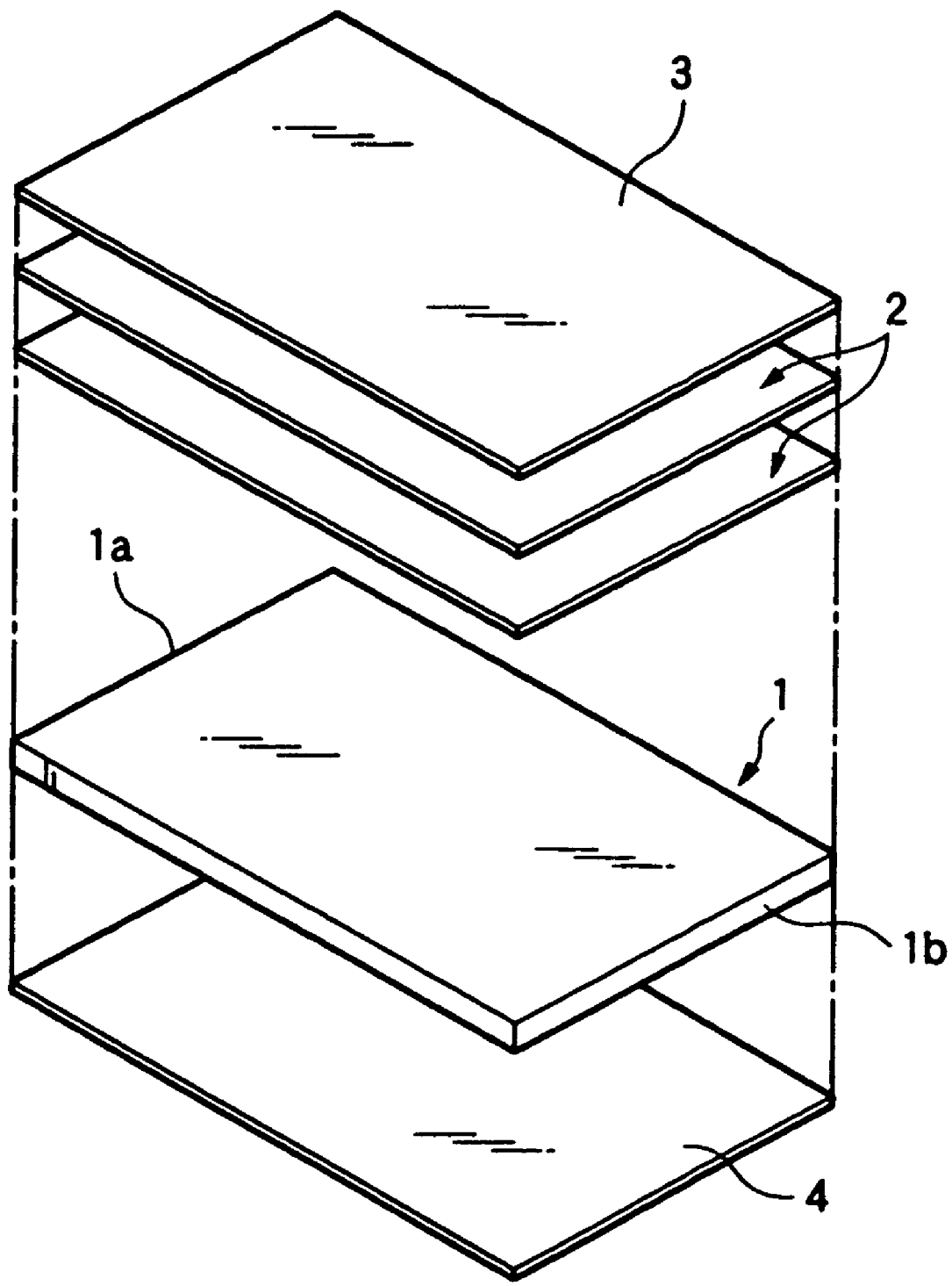
FIG. 1 is a perspective view of an exploded state of a back light unit.

In FIG. 1, symbol 1 shows a light guide plate made of transparent synthetic resin such as acryl, symbol 2 shows a light diffusion sheet laminated surface side of the synthetic resin 1, and symbol 3 shows a brightness rising sheet laminated on the light diffusion sheet 2 in layers.

Symbol 4 shows a reflective sheet laminated at rear surface side of the light guide plate 1.

After laminating two light diffusion sheets 2 and one brightness rising sheet 3 on surface side of the light guide plate 1 in layers, these sheets 2 and 3 are fixed to the light guide plate using welding by ultrasonic vibration. For the fixing, the following method is adopted.

Figure 2:
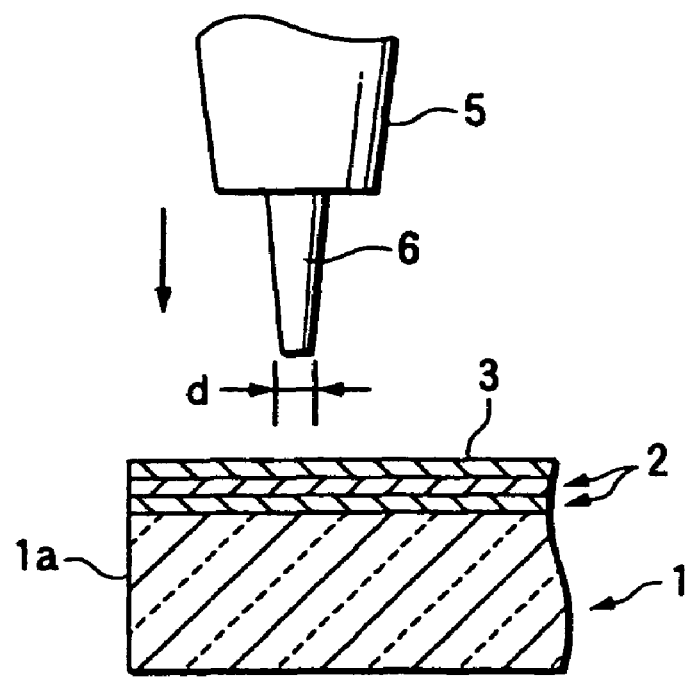
FIG. 2 is an enlarged sectional view showing a state laminating various kind of sheets on a light guide plate.
Figure 3:
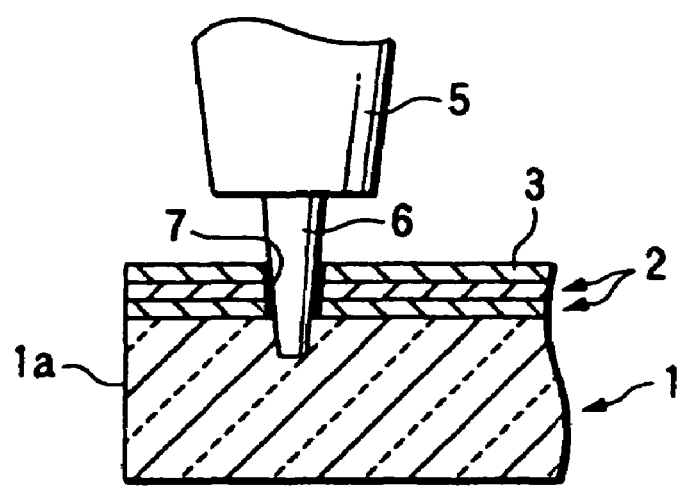
FIG. 3 is an enlarged sectional view showing a state fixing the various kind of sheets on the light guide plate.

That is, a pin 6 of about 0.5 to 1 mm in diameter D at a horn for ultrasonic welding, and the pin 6 is press-fitted to the various kind of sheets 2 and 3 as shown in FIG. 2. By the press-fitting, the pin 8 is pushed into the depth reaching the light guide plate 1 breaking through the various kind of sheets 2 and 3 as shown in FIG. 3.

By the breaking-through, a hollow hole 7 is formed at a laminating body of the various kind of sheets 2 and 3 and the light guide plate 1, a part contacting the pin 6 among the various kind of sheets 2 and 3 is pushed into the hollow hole 7 drawing out, and a part of the light guide plate 1 melts, exudes, and welds to the various kind of sheets 2 and 3. Therefore, the various kind of sheets 2 and 3 and the light guide plate 1 are welded surely in the hollow hole 7.

Figure 4:
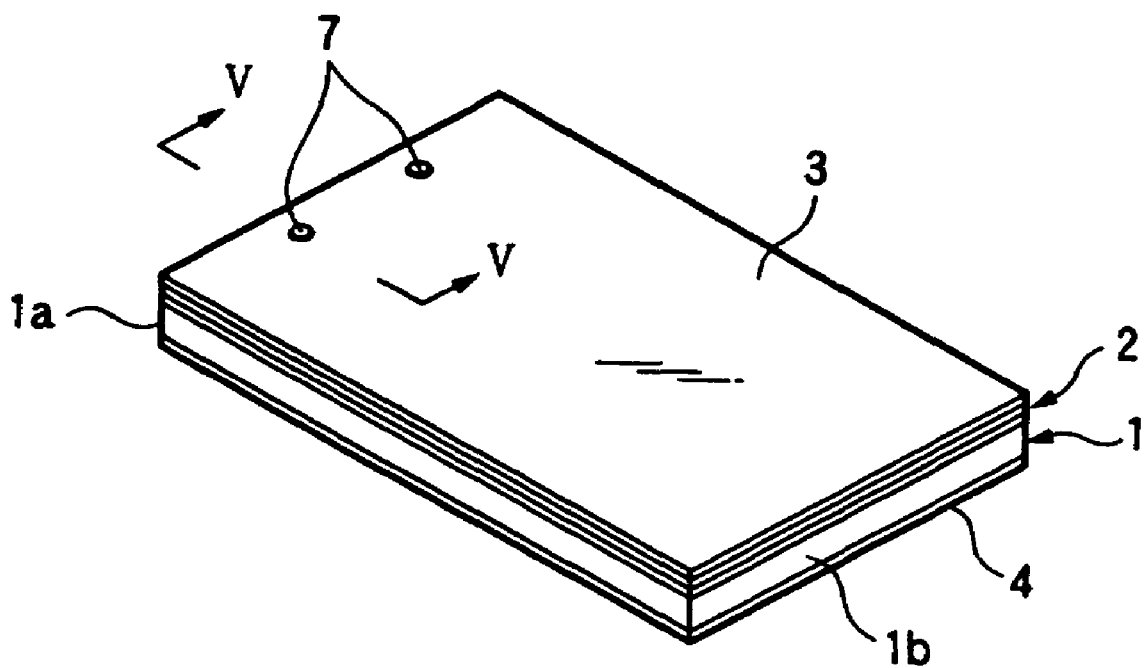
FIG. 4 is a perspective view of the back light unit.

In the case that the brightness rising sheet 3 is laminated adding to the light diffusion sheet 2, the welding is performed at a part close to one side surface 3a of the light guide plate 1 at plural places along the one side surface 3a as shown in FIG. 4 without performing at both, right and left, side faces 3a and 3b of the plate. By the welding, the light diffusion of sheet 2 and the brightness rising sheet 3 are fixed surely with the state not shifting sideways to the light guide 1, and it is avoided to generate wrinkles at the diffusion sheet 2 and the brightness rising sheet 3 because of difference of thermal expansion with the light guide plate 1.

In the case that wrinkles at the diffusion sheet 2 and the brightness rising sheet 3 because of difference of thermal expansion body 1 do not possibly generate, the welding may be performed at close to both, right and left, side faces 3a and 3b of the light guide plate 1.

Figure 5:
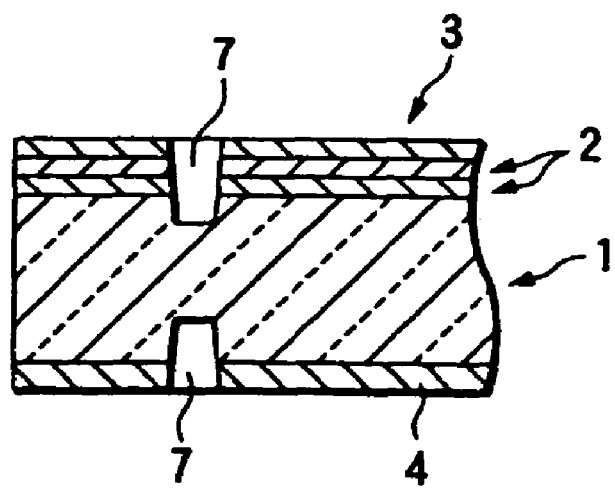
FIG. 5 is an enlarged sectional view viewed from V-V of FIG. 4.

At fixing the reflective sheet 4 to rear surface of the light guide plate 1, the welding is performed similarly as the above-mentioned as shown in FIG. 5.

Incidentally, the pin 6 provided at the horn 5 for ultrasonic welding is drawn after press-fitting to the depth reaching the light guide 1 breaking through the various kind of sheets 2 and 3. However, in this case, welding strength of the various kind of sheets 2 and 3 to the light guide plate 1 is possibly decreased because there is tendency to draw up various kind of sheets 2 and 3.

About this, the invention proposes to construct the pin 6 provided at the horn 5 for ultrasonic welding in taper shape of thin nose as shown in the figure.

By the construction of the taper shaped pin 6, press-fitting to the depth reaches the light guide plate 1 breaking trough the various kind of sheets 2 and 3 is performed easily. Further, since the pin can be pulled out from the press-fitted state and drawing-up the various kind of sheets 2 and 3 is avoided at pulling the pin 6 out, reliability of welding and welding strength in the hollow hole are further improved.

Another embodiment of the invention will be described referring FIG. 6 to FIG. 12.

Figure 6:
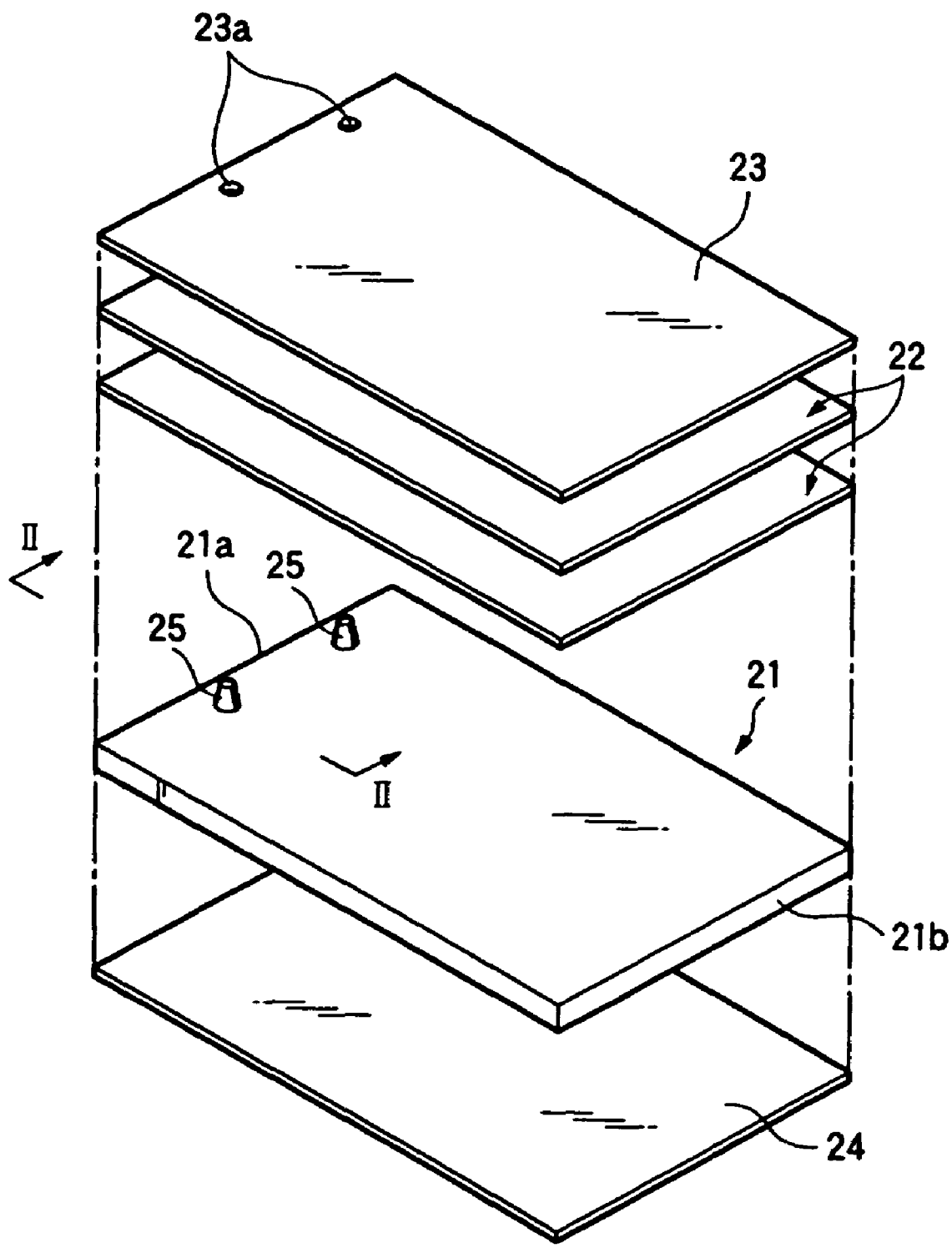
FIG. 6 is a perspective view of an exploded state of a back light unit.

In FIG. 6, symbol 21 shows a light guide plate made of transparent synthetic resin such as acryl, symbol 22 shows a light diffusion sheet laminated surface side of the synthetic resin 21, and symbol 23 shows a brightness rising sheet laminated on the light diffusion sheet 22 in layers.

Symbol 24 shows a reflective sheet laminated at rear surface side of the light guide plate 21.

After laminating two light diffusion sheets 22 and one brightness rising sheet 23 on surface side of the light guide plate 1 in layers, these sheets 22 and 23 are fixed to the light guide plate using welding by ultrasonic vibration. For the fixing, the following method is adopted.

Figure 7:
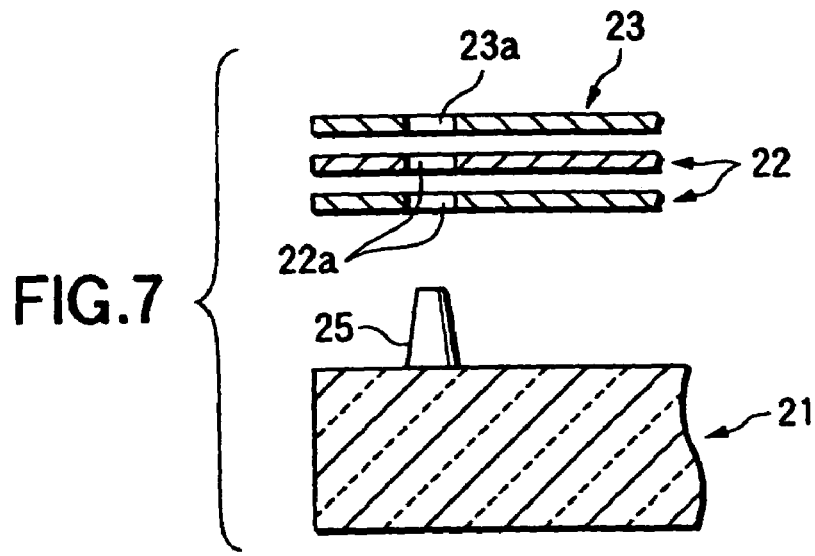
FIG. 7 is an enlarged sectional view viewed from II-II of FIG. 6.

As shown in FIG. 6 and FIG. 7 pins 25 constructed in taper shape of thin nose are projected integratedly at a part portion close to one side surface 21a of the light guide plate 21 and at two part portions along the one side surface 21a, and holes 22a and 22b where the both pins 25 of the two light diffusion sheets 22 and the brightness rising sheet 23 are fitted in are made.

Figure 8:
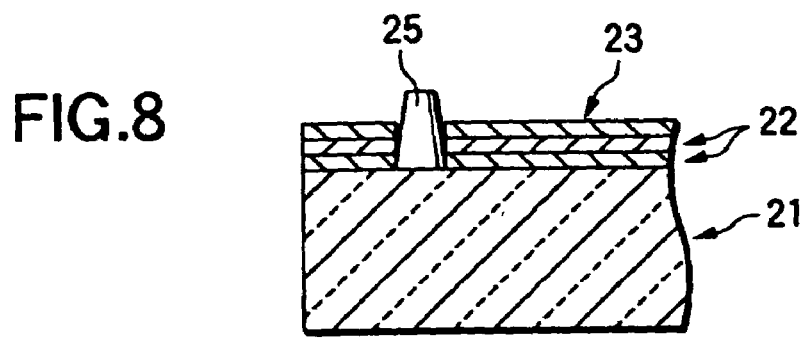
FIG. 8 is an enlarged sectional view showing a state laminating the various kind of sheets on the light guide plate.

After the two light diffusion sheets 22 and the brightness rising sheet 23 are laminated on surface of the light guide plate 21 so that the pins 25 are fitted into each of the holes 22a and 23a made at these sheets as shown in FIG. 8, the tip end of the pins 25 are pressed to axial direction at the condition applying ultrasonic vibration contacting a horn for ultrasonic welding.

Figure 9:
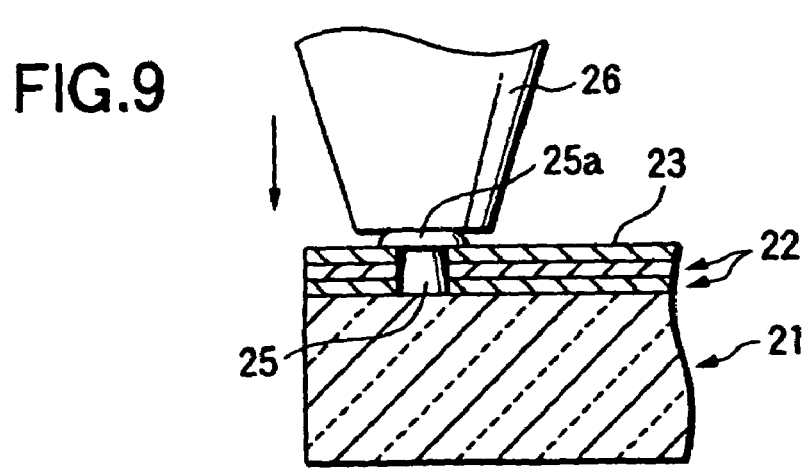
FIG. 9 is an enlarged sectional view showing a state fixing the various kind of sheets on the light guide plate.
Figure 10:
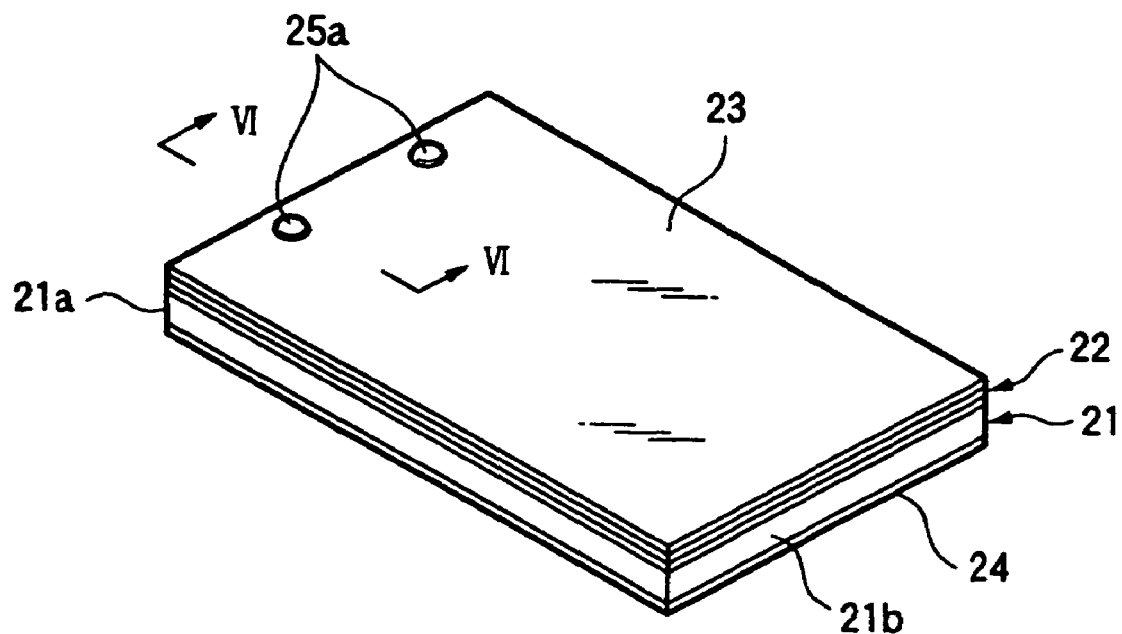
FIG. 10 is a perspective view of the back light unit.

Thus, the tip end of thin nose of the pin 25 melts earlier than a part of root to the light guide plate 21 among the pin 25 and is distorted by caulking in flat shape (the part distorted by caulking is shown with symbol 25a) as shown in FIG. 9, thereby the various kind of sheets 22 and 23 are fixed surely and strongly to the light guide plate 21.

By making the pin 25 taper shape of thin nose, the tip end of thin nose of the pin 25 melts, crushes, and distorts earlier than the root portion among the entire pin 25 to the light guide plate 21. Because of that, it is avoided that the root portion melts earlier and the melting resin of the pin invades between the light guide plate 21 and the various kind of sheets 22 and 23, and between mutual various kind of sheets 22 and 23, thereby it is surely prevented that space generates between the various kind of sheets 22 and 23 and the light guide plate 21, and between mutual various kind of sheets 22 and 23 at distorting the pin 25 by caulking using ultrasonic wave.

As described above, by fixing using the pin 25 at a part close to one side surface 23a at plural places along the one side surface 23a, the light diffusion sheet 22 and the brightness rising sheet 23 are fixed surely with the state not shifting sideways to the light guide 21, and it is surely avoided to generate wrinkles at the light diffusion sheet 22 and the brightness rising sheet 23 because of difference of thermal expansion with the light guide plate 21 at distorting the tip end of the pin melting by ultrasonic vibration.

In the case that wrinkles at the diffusion sheet 22 and the brightness rising sheet 23 caused by difference of thermal expansion body 21 do not possibly generate, the welding by the pin 25 may be performed at close to both, right and left, side faces 21a and 21b of the light guide plate 21.

Figure 11:
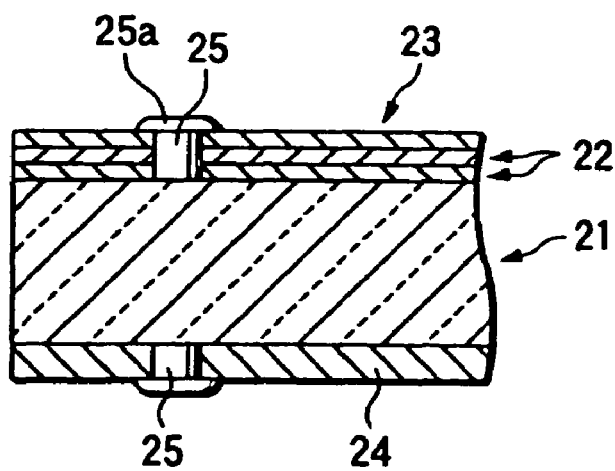
FIG. 11 is an enlarged sectional view viewed from VI-VI of FIG. 10.

At fixing the reflective sheet 24 to rear surface of the light guide plate 21, the welding is performed similarly as the above-mentioned as shown in FIG. 11.

Figure 12:
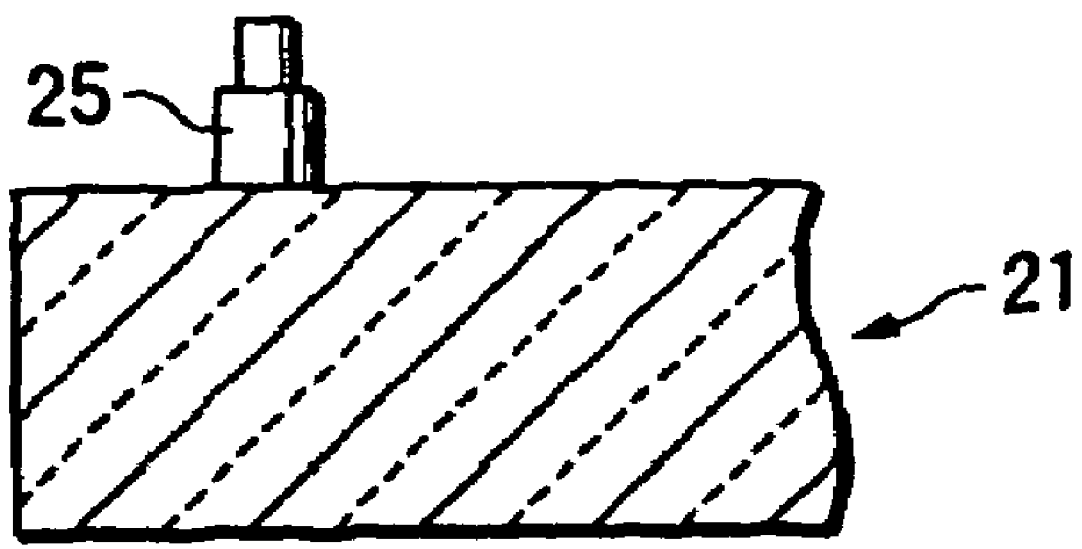
FIG. 12 is an enlarged sectional view showing another mode for carrying out.

Further, at constructing the pin 25 in thin nose, a stepped pin 25' having small diameter only at tip end may be constructed as shown in FIG. 12 without limiting to the taper shape of thin nose. However, when the pin 25 is constructed in taper shape of thin nose, working efficiency laminating the various kind of sheets 22 and 23 on surface of the light guide plate 21 so that the pins 25 fit into each of holes 22a and 23a can be improved.

What is claimed is:

1. A back light unit for a liquid crystal display device, the back light unit laminating at least a sheet member chosen from a group of a light diffusion sheet, a combination of a light diffusion sheet and a brightness rising sheet, and a reflective sheet on a light guide plate made of transparent synthetic resin arranged at rear surface side of a liquid crystal display device,
    wherein the sheet member is welded to the light guide plate by press-fitting a pin provided at a horn for ultrasonic welding to the depth reaching the light guide plate breaking through the sheet member from surface side of the sheet member.

2. A method for manufacturing a back light unit for a liquid crystal display device, comprising the steps of:
    laminating at least a sheet member chosen from a group of a light diffusion sheet, a combination of a light diffusion sheet and a brightness rising sheet, and a reflective sheet on a light guide plate made of transparent synthetic resin arranged at rear surface side of a liquid crystal display device, and
    press-fitting a pin provided at a horn for ultrasonic welding to the depth reaching the light guide plate breaking through the sheet member from surface side of the sheet member.

3. A method for manufacturing back light unit for a liquid crystal display device according to claim 2,
    wherein the pin of the horn is formed in taper shape of thin nose.

4. A method for manufacturing back light unit for a liquid crystal display device according to claim 2,
    wherein the press-fitting of the pin is performed at close to one side surface of the light guide plate at plural places along the one side face.

* * * * *